(12) United States Patent
Mehrer et al.

(10) Patent No.: US 9,194,734 B2
(45) Date of Patent: Nov. 24, 2015

(54) LIQUID LEVEL SENSOR SYSTEM

(75) Inventors: Michael E. Mehrer, San Diego, CA (US); Richard Gunderson, Santee, CA (US); Wagdy Wahba, San Diego, CA (US)

(73) Assignee: United Technologies Corporation, Hartford, CT (US)

( * ) Notice: Subject to any disclaimer, the term of this patent is extended or adjusted under 35 U.S.C. 154(b) by 734 days.

(21) Appl. No.: 13/544,443

(22) Filed: Jul. 9, 2012

(65) Prior Publication Data
US 2014/0007675 A1 Jan. 9, 2014

(51) Int. Cl.
*G01F 23/24* (2006.01)

(52) U.S. Cl.
CPC .................................. *G01F 23/247* (2013.01)

(58) Field of Classification Search
CPC .... G01F 23/247; G01F 23/248; G01F 23/246
See application file for complete search history.

(56) References Cited

U.S. PATENT DOCUMENTS

| | | | |
|---|---|---|---|
| 5,117,216 A | 5/1992 | McQueen | |
| 5,167,153 A | 12/1992 | McQueen | |
| 5,201,223 A | 4/1993 | McQueen | |
| 5,719,332 A * | 2/1998 | Wallrafen | 73/295 |
| 6,024,290 A | 2/2000 | Dosani et al. | |
| 6,202,486 B1 | 3/2001 | Kemp | |
| 7,392,691 B1 * | 7/2008 | Yeckley | 73/64.55 |
| 7,650,759 B2 * | 1/2010 | Park et al. | 62/149 |
| 7,904,229 B2 | 3/2011 | Walthall et al. | |
| 8,446,284 B2 * | 5/2013 | Mehrer et al. | 340/618 |
| 2008/0093173 A1 | 4/2008 | James et al. | |
| 2010/0175471 A1 | 7/2010 | Dennis, Jr. et al. | |
| 2011/0010069 A1 | 1/2011 | Payne et al. | |
| 2011/0012592 A1 | 1/2011 | Paradise | |
| 2011/0061418 A1 | 3/2011 | Ishihara et al. | |
| 2011/0211612 A1 * | 9/2011 | Branecky | 374/115 |

FOREIGN PATENT DOCUMENTS

| | | | |
|---|---|---|---|
| JP | 07071823 A | 3/1995 | |
| JP | 08063236 A | 3/1996 | |
| JP | 08263148 A | 10/1996 | |

OTHER PUBLICATIONS

International Search Report and Written Opinion, dated Sep. 27, 2013, PCT Application No. PCT/US2013/049745, 16 pages.

\* cited by examiner

*Primary Examiner* — Daniel S Larkin
*Assistant Examiner* — Jamar Ray
(74) *Attorney, Agent, or Firm* — Kinney & Lange, P.A.

(57) ABSTRACT

A liquid replenishment system includes a reservoir, a first temperature sensor positioned in the reservoir at a full level, a second temperature sensor positioned in the reservoir at an add level, and a controller. The controller is connected to both the first and second sensors. The controller receives temperature signals from the first and second temperature sensors at first and second times. The controller sends an add liquid signal if temperature sensed by the first temperature sensor is substantially different at the first and second times and if temperature sensed by the second temperature sensor is substantially different at the first and second times. The controller sends a full signal if temperature sensed by the first temperature sensor is substantially the same at the first and second times and if temperature sensed by the second temperature sensor is substantially the same at the first and second times.

11 Claims, 4 Drawing Sheets

LIQUID LEVEL SENSOR SYSTEM

BACKGROUND

The present invention relates to liquid level sensing and, in particular, to sensing liquid levels in refillable reservoirs, such as sensing oil levels in gas turbine engines. Gas turbine engines include lubrication systems that use a lubricating liquid, such as oil, to cool and lubricate components such as gears and bearings. Such systems typically use oil during operation such that the quantity of oil in the lubrication system is diminished over time. Thus, lubrication systems typically include one or more sensors to determine the quantity of oil in the system. In addition, some systems incorporate an oil replenishment system that performs a process that refills a sump or other reservoir. Overfilling a sump can cause mechanical damage to engine components.

It can be difficult, however, to accurately determine the quantity of oil in a lubrication system at a given time. For example, one type of gas turbine engine is an auxiliary power unit (APU) for use on an aircraft. Varying oil temperature causes the actual volume of oil to vary, making it difficult to obtain useful sensor measurements. In addition, sloshing of oil during aircraft movement or while the engine is operating increases the difficulty of obtaining useful measurements. Consequently, oil levels measured during flight or while the engine is operating can be inaccurate.

Reading of sensors, such as capacitive sensors, can be used to provide relatively accurate readings while the oil environment is stable; however, such capacitance sensors can be relatively large, which can be problematic for use in relatively small sumps or other small reservoirs. In addition, these capacitance sensors require interfaces with noise shielding and compensative wires that add to system weight. Other available systems can also have limited effectiveness in small reservoirs, and can be complicated, expensive, relatively heavy, and/or unreliable.

SUMMARY

A liquid replenishment system includes a reservoir, a first temperature sensor positioned in the reservoir at a full level, a second temperature sensor positioned in the reservoir at an add level, and a controller. The controller is connected to both the first and second sensors. The controller receives temperature signals from the first and second temperature sensors at first and second times. The controller sends an add liquid signal if temperature sensed by the first temperature sensor is substantially different at the first and second times and if temperature sensed by the second temperature sensor is substantially different at the first and second times. The controller sends a full signal if temperature sensed by the first temperature sensor is substantially the same at the first and second times and if temperature sensed by the second temperature sensor is substantially the same at the first and second times.

Another embodiment is a method of replenishing liquid in a reservoir. The method includes sensing temperature of first and second temperature sensors at a first time, heating the first and second temperature sensors, terminating heating of the first and second temperature sensors, and sensing temperature of the first and second temperature sensors at a second time after heating the first and second temperature sensors. The first and second temperature sensors are positioned at a full level and an add level of the reservoir, respectively. Liquid is added to the reservoir if temperature sensed by the first temperature sensor is substantially different at the first and second times and if temperature sensed by the second temperature sensor is substantially different at the first and second times. Addition of liquid is terminated if temperature sensed by the first temperature sensor is substantially the same at the first and second times and if temperature sensed by the second temperature sensor is substantially the same at the first and second times.

DETAILED DESCRIPTION

Figure 1:
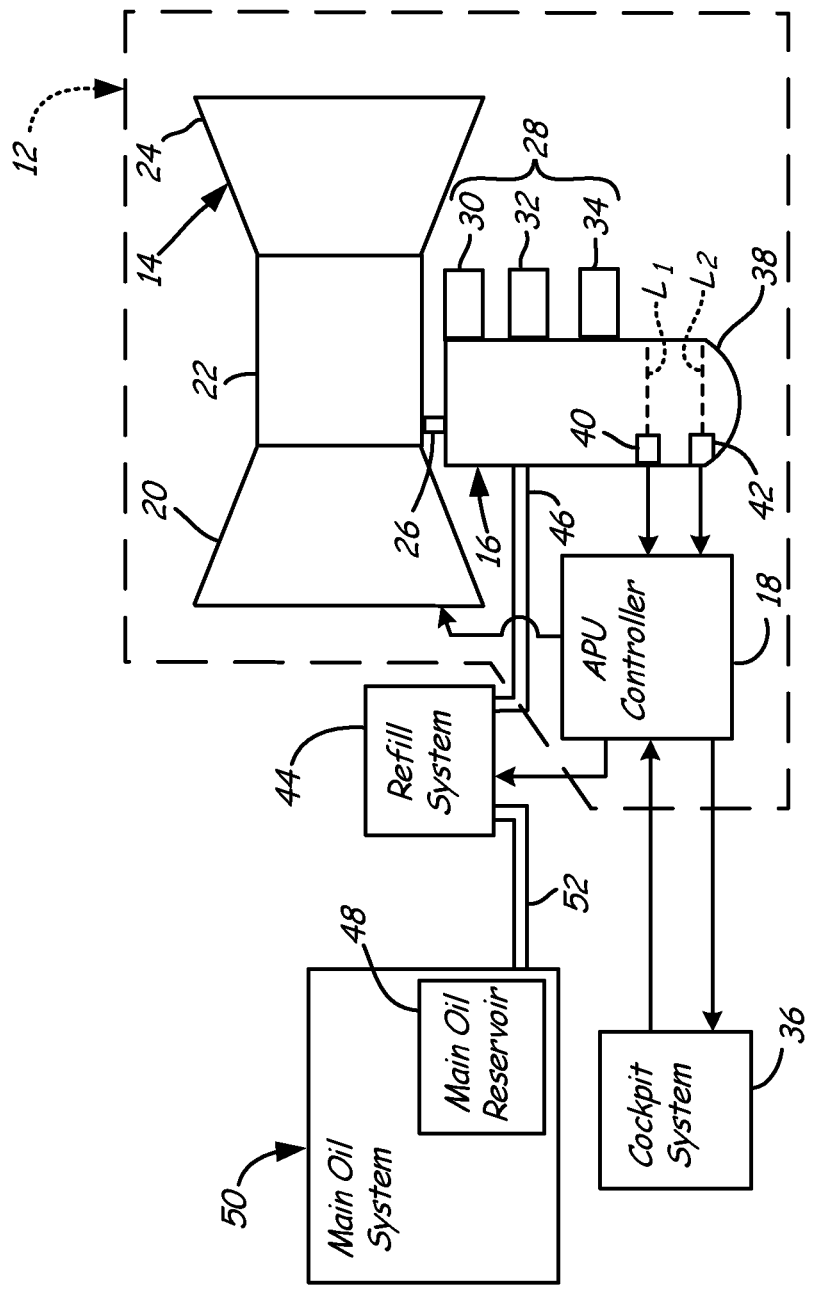
FIG. 1 is a schematic view of an aircraft system including an auxiliary power unit.

FIG. 1 is a schematic view of aircraft system 10 including an auxiliary power unit (APU) system 12. APU system 12 includes gas turbine engine 14, gearbox 16, and APU controller 18. Gas turbine engine 14 includes compressor 20, combustor 22, and turbine 24, which function in a manner known in the art. In operation, aircraft system 10 can be part of an aircraft (not shown) having propulsion gas turbine engines (not shown) that are separate from gas turbine engine 14. Gas turbine engine 14 of APU system 12 is included on the aircraft to provide auxiliary power; it includes no fan or propeller for propulsion.

Gearbox 16 is an accessory gearbox that is mechanically driven by gas turbine engine 14 via shaft 26. Accessories 28 are mounted to and mechanically driven by gearbox 16. In the illustrated embodiment, accessories 28 include electrical generator 30, fuel pump 32, and oil pump 34. In alternative embodiments, other accessories can be mounted to and driven by gas turbine engine 14 via gearbox 16. Electrical generator 30 can provide electrical power to various components and systems throughout aircraft system 10 and the rest of the aircraft. For example, electrical generator 30 can be connected to and power APU controller 18 and/or cockpit system 36. Fuel pump 32 is connected to and pumps fuel to gas turbine engine 14. Oil pump 34 is connected to and pumps oil to various components in APU system 12, such as gears and bearings (not shown) in gas turbine engine 14, gearbox 16, and accessories 28.

Oil in gearbox 16 lubricates gears (not shown) and is collected in sump 38. Sump 38 is a reservoir for storing oil to be pumped by oil pump 34 to the various components in need of oil. Sensors 40 and 42 are positioned in sump 38 to sense a level of oil in sump 38. In the illustrated embodiment, sensors 40 and 42 are resistance temperature detector (RTD) sensors, whereby the resistance of sensors 40 and 42 varies according to whether sensors 40 and 42 are immersed in oil or in air. Sensor 40 is positioned in sump 38 at level $L_1$, which is vertically higher than a position of sensor 42, which is at level $L_2$. Sensors 40 and 42 are connected to APU controller 18. If the level of oil in sump 38 meets or exceeds level $L_1$, then sensor 40 can send a signal to APU controller 18, indicating that sump 38 is full. If the level of oil in sump 38 is below level $L_1$, then sensor 40 can send a signal to APU controller 18, indicating that sump 38 is not full. If the level of oil in sump 38 is below level $L_2$, then sensor 42 can send a signal to APU controller 18, indicating that sump 38 needs to be refilled. If the level of oil in sump 38 is at or above level $L_2$, then sensor 42 can send a signal to APU controller 18, indicating that sump 38 does not need to be refilled. In other embodiments, sensors 40 and 42 can be other types of sensors capable of indicating a level of oil.

Cockpit system 36 is an electronic system that includes one or more cockpit computers for use by a pilot and crew during operation of the aircraft. In the illustrated embodiment, APU controller 18 is a full authority digital engine controller (FADEC) that controls operation of gas turbine engine 14. APU controller 18 also includes an algorithm that estimates an approximate oil level in sump 38 with a value based upon elapsed operating time since sump 38 was at or above level $L_1$. Thus, APU controller 18 can determine oil level in sump 38 according to data contemporaneously received from sensors 40 and 42 or according to the algorithm that estimates an approximate oil level. Both determinations can be useful under circumstances described below.

During operation, APU system 12 consumes oil such that the level of oil in sump 38 decreases from an initial full level (level $L_1$) to a lower level (level $L_2$) over time. In the illustrated embodiment, level $L_2$ does not indicate that sump 38 is completely empty but rather that it is low enough that it needs to be refilled. In one embodiment, sump 38 can have a volume of about 3.0 liters, with the difference between level $L_1$ and level $L_2$ being about 0.3 liters. During flight, sensors 40 and 42 can be inaccurate due to sloshing of oil in sump 38, due to thermal expansion of oil caused by heat in sump 38 and the rest of APU system 12, and due to other operational variances. For example, in one embodiment, the same quantity of oil can have a change in volume of about 10% in response to a change in temperature from about −40° F. (about −40° C.) to about 270° F. (about 132° C.). Additionally, during negative gravity conditions oil in sump 38 can rise toward a top of gearbox 16, rather than settling down in sump 38. Thus, APU controller 18 can be programmed to rely on sensors 40 and 42 only when sensors 40 and 42 are deemed to be reliable, such as when APU system 12 is off, the oil has cooled to a designated temperature or temperature range, and the aircraft is on the ground. APU controller 18 can, essentially, ignore data from sensors 40 and 42 at other times. This allows APU controller 18 to correctly identify when sump 38 requires refilling without sending inaccurate oil level signals at other times. APU controller 18 can send a full signal when sensor 40 indicates that oil level in sump 38 is at or above level $L_1$ and send a fill signal when sensor 42 indicates that oil level in sump 38 is at or below level $L_2$.

In the illustrated embodiment, aircraft system 10 includes refill system 44, which is fluidically connected to sump 38 via passage 46 for refilling sump 38 with oil. When the pilot receives an indication that sump 38 requires additional oil, the pilot can input a signal via cockpit system 36 to refill sump 38. Cockpit system 36 signals refill system 44, via APU controller 18, to refill sump 38. When the level of oil in sump 38 is refilled to level $L_1$, APU controller 18 automatically signals refill system 44 to stop refilling sump 38.

In the illustrated embodiment, refill system 44 is also connected to main oil reservoir 48 of main oil system 50 via passage 52. Main oil reservoir 48 can store oil for use on aircraft equipment other than APU system 12, such as the aircraft's propulsion engines (not shown). Main oil system 50 is otherwise independent from sump 38, as sump 38 stores oil for use in APU system 12 without use of oil in main reservoir 48. In an alternative embodiment, passage 52 can be omitted such that refill system 44 is dedicated to APU system 12. In another alternative embodiment, refill system 44 can be omitted such that sump 38 would be refilled by other means.

Figure 2:
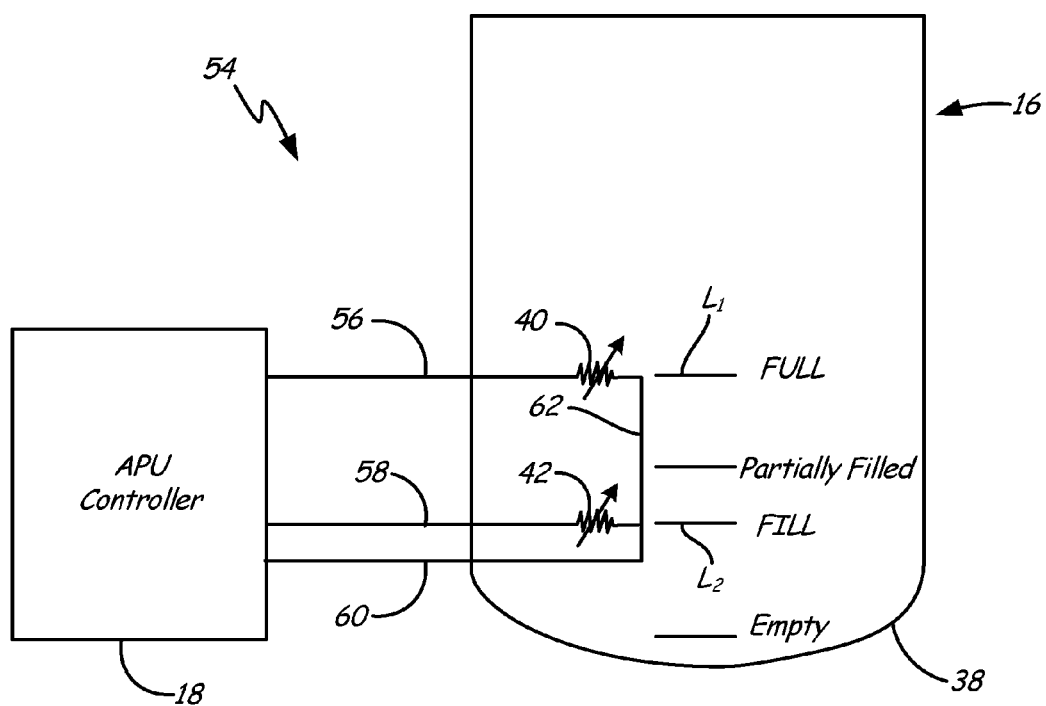
FIG. 2 is a schematic view of a liquid level sensor system.

FIG. 2 is a schematic view of liquid level sensor system 54, which includes APU controller 18, sensor 40, and sensor 42 connected by electrical paths 56, 58, 60, and 62. Electrical paths 56, 58, 60, and 62 can be wires, leads, or other electrical connections capable of transmitting an electrical current between controller 18, sensor 40, and sensor 42. Electrical path 56 connects APU controller 18 to sensor 40 to allow APU controller 18 to send a current through and detect resistance of sensor 40. Electrical path 58 connects APU controller 18 to sensor 42 to allow APU controller 18 to send a current through and detect resistance of sensor 42. Electrical path 60 is a return path electrically connecting APU controller 18 to sensors 40 and 42, to allow the electrical current sent through sensors 40 and 42 to return through electrical path 60. Electrical path 62 connects sensor 40 to electrical path 60.

In the illustrated embodiment, sensors 40 and 42 are RTDs, which have a resistance that varies with temperature. Thus, APU controller 18 can detect changes in temperature of sensors 40 and 42 by detecting changes in resistance of sensors 40 and 42. APU controller 18 can heat sensors 40 and 42 by sending an energizing current through sensors 40 and 42. APU controller 18 can detect whether sensors 40 and 42 are immersed in a liquid (such as oil) or a gas (such as air) by first sensing temperature of sensors 40 and 42 at a first time, then sending an energizing current through sensors 40 and 42, and then sensing temperature of sensors 40 and 42 at a second time after the heating. In the illustrated embodiment, APU controller 18 is not connected to any other RTDs positioned inside reservoir 38 other than sensors 40 and 42.

Because air is a relatively poor heat conductor, temperature of sensors 40 and 42 will be substantially different (hotter) at the second time relative to the first time if temperature sensors 40 and 42 are immersed in air. This indicates that the level of oil in sump 38 is below level $L_2$. Because oil is a relatively good heat conductor, it will absorb excess heat from sensors 40 and 42. Thus, temperature of sensors 40 and 42 will be substantially the same at the second time relative to the first time if temperature sensors 40 and 42 are immersed in oil. This indicates that the level of oil in sump 38 is above level $L_1$. If temperature sensed by sensor 40 is substantially different at the first and second times and temperature sensed by sensor 42 is substantially the same at the first and second times, this indicates that the level of oil in sump 38 is between levels $L_1$ and $L_2$.

If the level of oil in sump 38 is below level $L_2$, APU controller 18 can send an add liquid signal to cockpit system 36 (shown in FIG. 1). A pilot or other operator can then activate refill system 44 (shown in FIG. 1) to refill sump 38. When refill system 44 refills sump 38, it can be important to not overfill sump 38, which could risk causing mechanical damage to APU system 12 (shown in FIG. 1). Liquid level sensor system 54 can continuously monitor oil level in sump 38 so as to allow refill system 44 to stop refilling sump 38 shortly after the level of oil in sump 38 reaches level $L_1$.

Figure 3A:
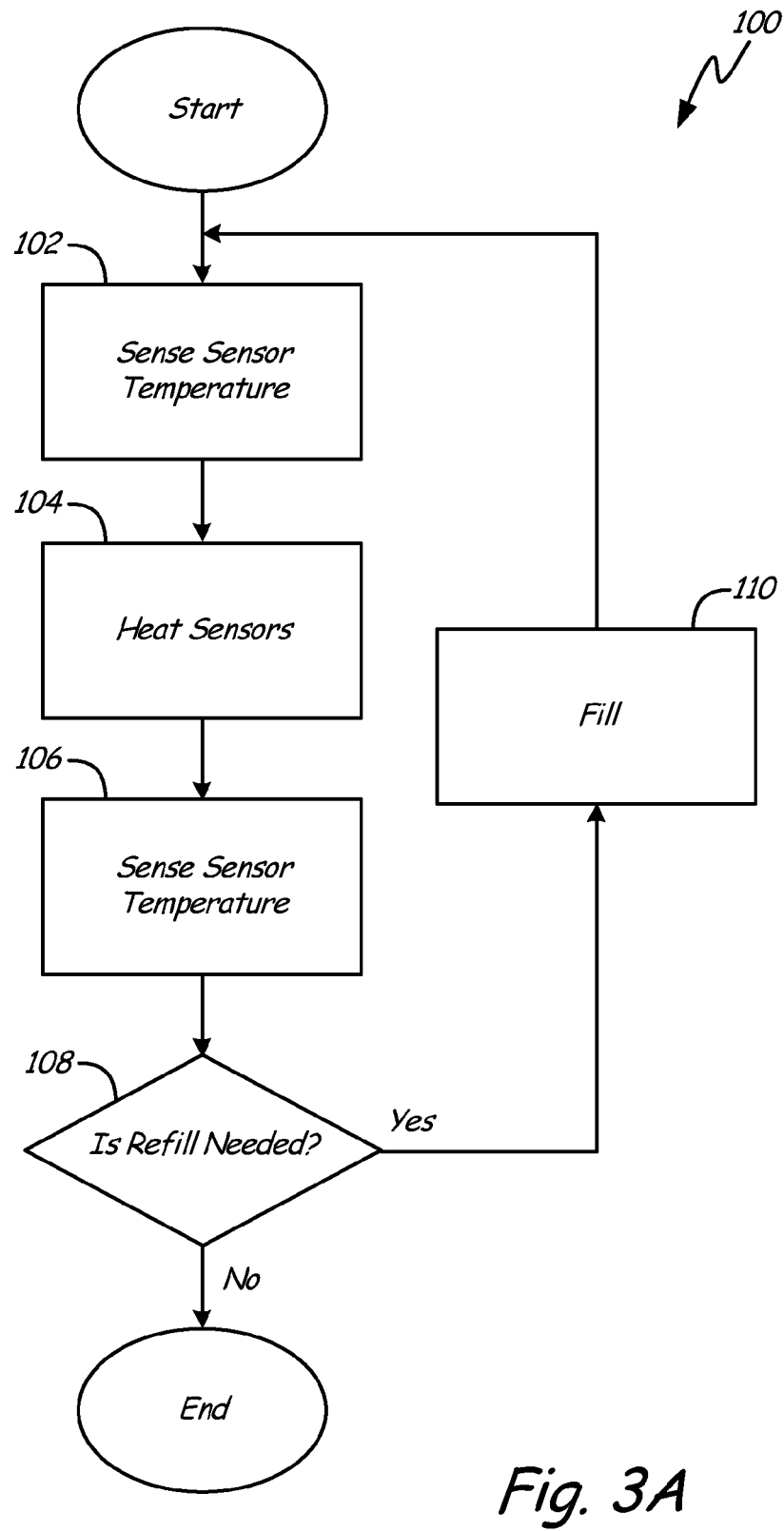
FIG. 3A is a flow chart of a method of pulsing oil level sensors and monitoring oil level in a sump during a refilling operation.

FIG. 3A is a flow chart of method 100, which is a method of monitoring oil level in sump 38 during a refilling operation involving repeatedly cycling heating and cooling of sensors 40 and 42. In step 102, APU controller 18 senses temperature of sensors 40 and 42 at a first time. APU controller 18 can designate these sensed temperature readings as initial time readings. In step 104, sensors 40 and 42 can be heated for an "on" cycle. In one embodiment, sensors 40 and 42 can be RTDs which are heated by APU controller 18 sending first and second energizing currents (or pulses) through sensors 40 and 42, respectively. In an alternative embodiment, sensors 40 and 42 can be another type of sensor and can be heated via an external heating element. In step 106, APU controller 18 can sense temperature of sensors 40 and 42 at a second time. APU controller 18 can designate these sensed temperature readings as delta time readings. Step 106 can occur while sensors 40 and 42 are being heated, or can occur after termination of heating of sensors 40 and 42. Step 106 can include several readings of each of sensors 40 and 42 or can include only one reading for each of sensors 40 and 42.

In step 108, APU controller 18 can determine if refill is needed and send a corresponding signal as a function of the sensed temperatures from sensors 40 and 42. In the illustrated embodiment, the determination is not a function of any temperature detectors other than sensors 40 and 42. APU controller 18 determines if refill is needed by evaluating the difference between the initial time reading (from step 102) and the delta time reading (from step 106) for each of sensors 40 and 42. A relatively large temperature difference indicates that a given sensor is above the liquid line. A relatively small temperature difference indicates that a given sensor is above the liquid line. Thus, if temperature sensed by sensor 42 is substantially different at the first and second times and if temperature sensed by sensor 40 is substantially different at the first and second times, then APU controller 18 can send an add liquid signal. If temperature sensed by sensor 42 is substantially the same at the first and second times and if temperature sensed by sensor 40 is substantially the same at the first and second times, then APU controller 18 can send a full signal.

In step 108, APU controller 18 determines whether refill is needed. If refill is not needed, then method 100 ends. If refill is needed, then refill system 44 refills sump 38 at step 110. Method 100 will continue to cycle and refill system 44 will continue refilling sump 38 until signaled to stop refilling. APU controller 18 can signal refill system 44 to stop refilling once the liquid level has exceeded the full level of sensor 40. Meanwhile, sensors 40 and 42 are allowed to cool in between pulses of heating. In one embodiment, sensors 40 and 42 are allowed to cool by reducing current passed through sensors 40 and 42, for example, by reducing current substantially to zero, such that sensors 40 and 42 are heated for a period, the heating is terminated, and then are allowed to cool for a period. Periods of heating and cooling can occupy approximately equal time periods, such as about 1 second each. By keeping heating in step 104 relatively short (such as about 1 second), the cooling period can also be kept relatively short (such as about 1 second). A relatively quick heating and cooling cycle can limit the maximum temperature of sensors 40 and 42 to a temperature below a dangerous level. A relatively quick heating and cooling cycle can also allow for relatively quick detection of the oil level reaching level $L_1$, thus allowing the refilling operation to be terminated before overfilling sump 38. Steps 102, 104, 106, 108, and 110 can be repeated until it is determined at step 108 that filling is no longer needed.

Figure 3B:
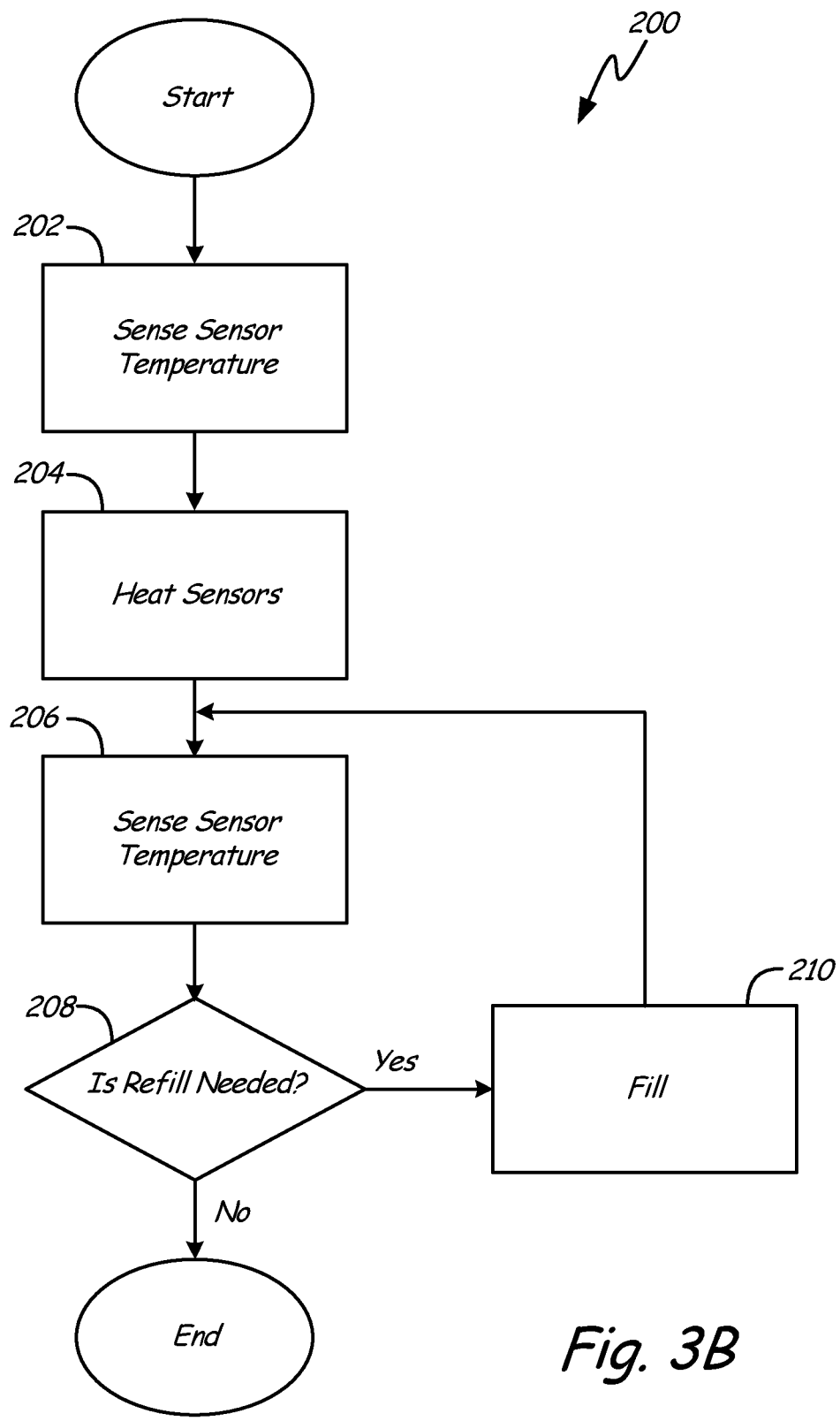
FIG. 3B is a flow chart of an alternate method of continuously monitoring oil level in a sump during a refilling operation.

FIG. 3B is a flow chart of method 200, which is a method of monitoring oil level in sump 38 during a refilling operation involving a single heating of sensors 40 and 42. In step 202, APU controller 18 senses temperature of sensors 40 and 42 at a first time. APU controller 18 can designate these sensed temperature readings as initial time readings. In step 204, sensors 40 and 42 can be heated for an "on" cycle. In one embodiment, sensors 40 and 42 can be RTDs which are heated by APU controller 18 sending first and second energizing currents (or pulses) through sensors 40 and 42, respectively. In an alternative embodiment, sensors 40 and 42 can be another type of sensor and can be heated via an external heating element. In step 206, APU controller 18 can sense temperature of sensors 40 and 42 at a second time. APU controller 18 can designate these sensed temperature readings as delta time readings. Step 206 occurs while sensors 40 and 42 are being heated.

In step 208, APU controller 18 can determine if refill is needed and send a corresponding signal as a function of the sensed temperatures. APU controller 18 determines if refill is needed by evaluating the difference between the initial time reading (from step 102) and the delta time reading (from step 106) for each of sensors 40 and 42. A relatively large temperature difference indicates that a given sensor is above the liquid. A relatively small temperature difference indicates that a given sensor is below the liquid. Thus, if temperature sensed by sensor 42 is substantially different at the first and second times and if temperature sensed by sensor 40 is substantially different at the first and second times, then APU controller 18 can send an add liquid signal. If temperature sensed by sensor 42 is substantially the same at the first and second times and if temperature sensed by sensor 40 is substantially the same at the first and second times, then APU controller 18 can send a full signal.

In step 208, APU controller 18 determines whether refill is needed. If refill is not needed, then sensors 40 and 42 can be de-energized and method 200 ends. If refill is needed, then refill system 44 refills sump 38 at step 212. Method 200 will continue to cycle and refill system 44 will continue refilling sump 38 until signaled to stop refilling. APU controller 18 can signal refill system 44 to stop refilling once the liquid level has exceeded the full level of sensor 40. In method 200 (as opposed to method 100), step 204 is bypassed and there are no additional pulses of energizing current sent through sensors 40 and 42. Instead, APU controller 18 sends only a small continuous current through sensors 40 and 42. This small current is sufficient to detect resistance (and thus temperature) of sensors 40 and 42, but is not enough current to substantially heat sensors 40 and 42. APU controller 18 then detects liquid level by comparing temperature sensed by sensor 40 to temperature sensed by sensor 42. If the temperature difference between sensor 40 and sensor 42 is substantial, then sensors 40 and 42 are determined to be in different fluids (e.g. sensor 42 is in the liquid and sensor 40 is in the gas). If the temperature difference changes such that the temperature difference is not substantial, then it is determined that liquid has passed the full line and both sensors 40 and 42 are in the liquid.

In step 200, APU controller 18 senses temperature of sensors 40 and 42 during the refilling operation. If sensor 42 is immersed in oil and sensor 40 is immersed in air during refilling, then temperature of sensor 42 will be different from temperature of sensor 40. This will indicate that sump 38 is partially filled, but not full. Step 208 can then send a fill signal, and steps 206, 208, and 210 can be repeated until it is determined at step 208 that filling is no longer needed. Once, while adding liquid to sump 38, there is a change such that temperature of sensor 40 is substantially that of sensor 42, then APU controller 18 can determine that the oil level has risen to level $L_1$, and that sump 38 is full. The addition of liquid by refill system 44 can be terminated, sensors 40 and 42 can be de-energized, and method 200 can end. Because sensors 40 and 42 are only heated briefly at the beginning of method 200, the maximum temperature of sensors 40 and 42 can be kept to a temperature below a dangerous level. A relatively quick cycle time for sensing temperature in step 214 can also allow for relatively quick detection of the oil level reaching level $L_1$, thus allowing the refilling operation to be terminated before overfilling sump 38.

Overall, aircraft system 10 can monitor liquid level in sump 38 relatively accurately and reliably. During refilling, liquid level sensor system 54 can monitor the level of oil in sump 38 substantially continuously, without extended periods of not measuring. This allows for refilling of sump 38 to be terminated shortly after sump 38 is full, and avoid overfilling sump 38 to a level that will damage components on APU system 12. In embodiments of liquid level sensor system 54 using only two RTDs, sensors 40 and 42 can be relatively small and suitable for use in relatively small reservoirs. This allows for sump 38 to be relatively small, yet avoid undesirable overfilling by refill system 44.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, in certain applications, sensors 40 and 42 could be positioned in a reservoir other than a sump for a gearbox. Additionally, some or all of the functions described with respect to cockpit system 36 and APU controller 18 could be performed by a separate controller. Moreover, APU system 12 can include additional sensors, other components, and/or features suitable for a particular application. In reservoirs that benefit from having additional fluid levels discretely sensed, one or more additional sensors could be included in addition to sensors 40 and 42.

The invention claimed is:

1. A method of replenishing liquid in a reservoir, the method comprising the following steps:
   sensing temperature of first and second temperature sensors at a first time, wherein the first and second temperature sensors are positioned at a full level and an add level of the reservoir, respectively;
   heating the first and second temperature sensors;
   terminating heating of the first and second temperature sensors;
   sensing temperature of the first and second temperature sensors at a second time after heating the first and second temperature sensors;
   adding liquid to the reservoir if temperature sensed by the first temperature sensor is different at the first and second times and if temperature sensed by the second temperature sensor is different at the first and second times and if the first and second temperature sensors are deemed to be reliable;
   repeating all of the above steps until the temperature sensed by the first temperature sensor is the same at the first and second times and if temperature sensed by the second temperature sensor is the same at the first and second times;
   terminating adding of liquid if temperature sensed by the first temperature sensor is the same at the first and second times and if temperature sensed by the second temperature sensor is the same at the first and second times;
   sending an estimated liquid level signal with a value estimated based upon elapsed operating time since liquid in the reservoir was at or above the full level if the first and second temperature sensors are deemed to be unreliable; and
   adding liquid to the reservoir in response to the estimated liquid level signal.

2. The method of claim 1, and further comprising:
   adding liquid to the reservoir if temperature sensed by the first temperature sensor is different at the first and second times and if temperature sensed by the second temperature sensor is the same at the first and second times.

3. The method of claim 1, wherein the liquid is an oil and the reservoir is a sump of a gearbox of an auxiliary power unit (APU) gas turbine engine.

4. The method of claim 1, wherein the first temperature sensor comprises a first resistance temperature detector (RTD) and the second temperature sensor comprises a second RTD.

5. The method of claim 4, wherein heating the first temperature sensor comprises sending a first current through the first RTD, and wherein heating the second temperature sensor comprises sending a second current though the second RTD.

6. The method of claim 5, wherein the first current and the second current return via a common return path.

7. The method of claim 5, wherein the first and second currents are passed through the first and second RTDs for approximately one second to heat the first and second RTDs, and wherein the first and second currents are reduced for approximately one second to allow cooling of the first and second RTDs.

8. The method of claim 7, wherein the first and second currents are reduced substantially to zero for the approximately one second.

9. The method of claim 7, wherein the first and second currents are repeatedly passed through the first and second RTDs for one second cycles while liquid is added to the reservoir.

10. The method of claim 4, wherein adding liquid is not a function of any temperature detectors other than the first and second RTDs.

11. The method of claim 1, wherein the first time is immediately prior to heating the first and second temperature sensors and wherein the second time is immediately after terminating heating of the first and second temperature sensors.

* * * * *